Sept. 1, 1964 W. STELZER 3,147,046
BRAKE PRESSURE PROPORTIONING DEVICE
Filed Dec. 18, 1961

INVENTOR.
William Stelzer
BY
Carness, Dickey & Pierce
ATTORNEYS

United States Patent Office 3,147,046
Patented Sept. 1, 1964

3,147,046
BRAKE PRESSURE PROPORTIONING DEVICE
William Stelzer, Bloomfield Hills, Mich., assignor to Kelsey-Hayes Company, Romulus, Mich., a corporation of Delaware
Filed Dec. 18, 1961, Ser. No. 159,969
9 Claims. (Cl. 303—24)

This invention relates to hydraulic brake systems for vehicles and particularly to a device for controlling the ratio of the brake pressures delivered to front and rear brake cylinders of a vehicle in response to the shift in weight borne by the front and rear wheels of the vehicle during deceleration.

Various devices have heretofore been proposed for regulating the brake pressure delivered to the rear wheels of a motor vehicle to change the ratio of the brake pressure delivered to said wheels compared to the brake pressure delivered to the front wheels. Such devices have incorporated a variety of deceleration responsive members adapted to sense rapid deceleration of the vehicle. Such devices are theoretically intended to permit maximum utilization of both front and rear brakes before skidding occurs. It is common for front engine passenger cars to utilize front brake cylinders having a greater cross-sectional area than the brake cylinders of the rear wheels, in view of the greater static weight loading on the front wheels compared to the rear wheels. However, the loading on the front wheels is increased substantially during rapid deceleration. It is well known that the effective braking effort of which a wheel is capable depends upon the weight borne by that wheel. Thus, as the loading on the front wheels is increased, the front wheels are able to exert a greater braking effort without skidding. Similarly, as weight is removed from the rear wheels, the braking effort of which the rear wheels are capable is decreased and the rear wheels will skid prior to the front wheels upon the application of a sufficiently high braking force unless some measure is taken to reduce the proportion of braking effort delivered to the rear wheels relative to the front wheels. The device of the present invention is intended to accomplish this function and is adapted to be interposed between the master cylinder and the rear wheel cylinders. During light or relatively normal braking efforts, brake pressure is transmitted directly through the device of the present invention without alteration. However, upon the attainment of a predetermined rate of deceleration, the device becomes effective to limit the fluid pressure delivered to the rear wheels. It is an object of the present invention to accomplish the transition from the normal to the reduce brake pressure delivered to the rear wheel brake cylinder in a smooth uninterrupted manner and while closely approximating the ideal or theoretically perfect brake pressure for the rear brake cylinders compared to the brake pressure delivered to the front brake cylinders.

It is another object of the present invention to provide a brake proportioning device of the above character incorporating a movable piston having resilient seals that are distortable under fluid pressure to transmit an "offsetting" fluid pressure to the piston to accomplish the aforesaid smooth transition in braking pressure delivered to the rear brakes.

It is another object of the present invention to provide a brake proportioning device of the above character having a novel deceleration responsive valve element structure which assures positive actuation of the valve element with a minimum of time lag when the desired rate of deceleration is attained.

It is still another object of the present invention to provide a device of the above character incorporating a novel piston and plunger arrangement which is operable to prevent premature closure of the valve element and which is also effective to reopen the valve element in the event of excessive travel of the piston and prevent possible loss of braking pressure to the rear wheels.

These and other objects of the present invention will become apparent from the following detailed description taken in conjunction with the accompanying drawings wherein.

Figure 1:
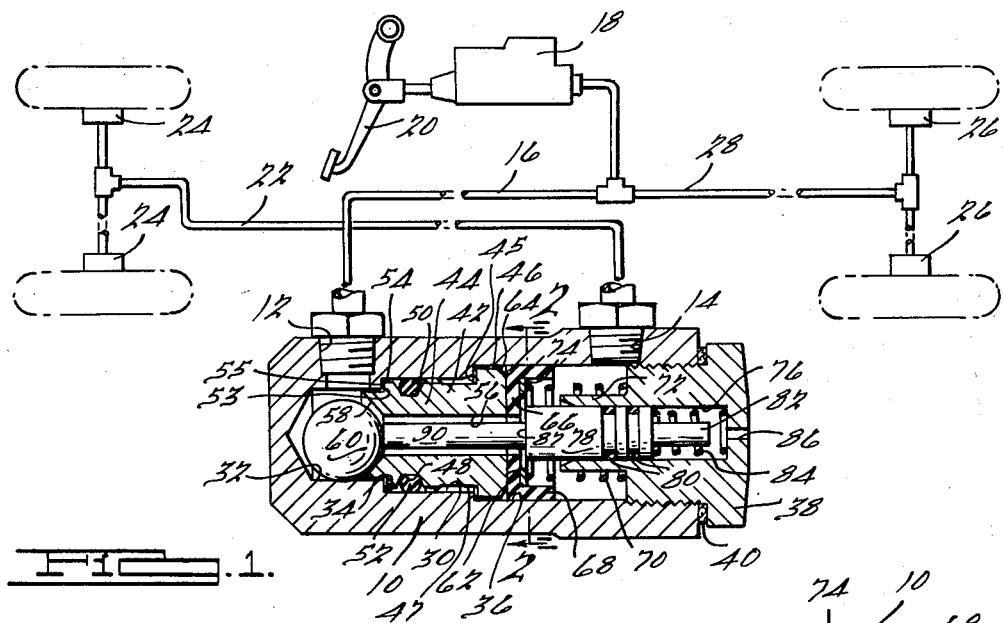
FIGURE 1 is a longitudinal sectional view through a brake pressure control device embodying the principles of the present invention, the device being shown in association with a diagrammatically illustrated brake system.
Figure 2:
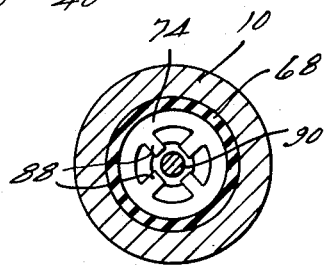
FIG. 2 is a sectional view of the structure illustrated in FIG. 1, taken along the line 2—2 thereof.

Referring now to the drawings, the device of the present invention will be seen to include a housing 10 having an inlet opening 12 and an outlet opening 14. The inlet opening 12 is connected by means of a conduit 16 to the usual brake master cylinder 18 which is operated by the customary brake pedal 20. The outlet opening 14 is connected through a conduit 22 to the rear brake cylinders 24. The front brake cylinders 26 are connected directly to the master cylinder 18.

The housing 10 is formed with a bore 30 of stepped or varying diameter and includes an extension or chamber 32 at one end thereof, a small diameter portion 34 and a large diameter portion 36. It will be seen that the bore 30 may be machined from the right-hand end thereof, which is open as the housing 10 is formed. However, the housing 10 is closed by a plug member 38 having a seal 40 held in fluid-tight engagement with the end of the housing 10 to prevent the passage of fluid thereby. A piston 42 is arranged within the bore 30 for sliding axial movement and includes a portion 44 slidable within the small diameter portion 34 and a large diameter portion 46 slidable within the large diameter bore portion 36. A radial shoulder 45 is formed on the piston intermediate the portions 44 and 46 and faces in a direction toward the inlet opening 12. A groove or reduced diameter portion 47 is located on the piston 42 between the shoulder 45 and the outer periphery of the portion 44, thus providing an annular opening adapted to be occupied by fluid for a purpose to be subsequently described.

The piston portion 44 is also provided with a peripheral groove 48 of somewhat V-shaped cross section. It will be seen that the groove 48 has at least one sloping shoulder 50 on the side thereof adjacent the shoulder 45 which slopes outwardly away from an O-ring 52 positioned within the groove 48. Thus, a recess or opening is provided between the O-ring 52 and the wall 50.

The bore 30 has a radial shoulder 53 between the small diameter bore portion 34 and the extension or chamber 32. This shoulder is normally engaged by a grooved shoulder 55 formed on the piston. Thus, with the piston shoulder 55 seated against the bore shoulder 53, fluid pressure is freely transmitted from the chamber 32 to the outer periphery of the piston portion 44. As indicated at 54, this periphery is sufficiently grooved to permit the flow of fluid therealong on both sides of the O-ring 52. However, it will be seen that the O-ring 52 provides a sealed connection between the piston 42 and the wall of the bore portion 34 to prevent the flow of fluid therepast.

The piston 42 is provided with a central passage 56 extending completely therethrough to provide fluid communication through the piston from the inlet opening 12 to the outlet opening 14. A combined ramp and valve seat surface 58 surrounds the end of the passage 56 adjacent the inlet opening 12. The surface 58 is of conical shape and is disposed coaxially with respect to the passage 56. The axis normally assumes a horizontal position as the device is mounted on the vehicle. A valve element in the form of a ball 60 is positioned within the chamber 32 and rests on the bottom thereof while also contacting the bottom portion of the ramp surface 58. As will be more fully discussed herein, the particular conical angle selected for the surface 58 will determine the rate of deceleration at which the ball 60 will ride up the surface 58 and make sealing contact therewith to block the direct transmission of fluid pressure from the inlet opening 12 to the passage 56.

The right hand end of the piston 42, which is adjacent the outlet opening 14, is provided with a flat surface 62 having its radially outer margin chamfered to form a recessed conical surface 64. The end wall surface 62 is flatly abutted by a face seal 66 having a cylindrical flange portion 68 sealingly engaging the wall of the bore portion 36. A light-weight return spring 70 is seated against the plug member 38 at one end thereof and is held in place by its surrounding relationship with a cylindrical extension 72 formed on the plug 38. The other end of the spring 70 contacts a washer 74 disposed flatly against the seal 66 to maintain the seal 66 in sealing engagement with the end wall 62 of the piston 42. It will be seen that the relationship of the seal 66 to the piston 42 is such as to leave a small annular cavity adjacent the conical surface 64. The seal 66, as well as the O-ring 52, are made from neoprene, rubber, or other suitable elastomeric resilient material and are adapted to be biased or distorted by fluid pressure adjacent the portions thereof in contact with the surrounding bore wall for a purpose which will subsequently become apparent.

The plug member 38 is provided with a central inwardly open bore 76 in which a piston 78 is positioned. The piston 78 has O-rings 80 recessed in the periphery thereof which sealingly contact the wall of the bore 76 to prevent the passage of fluid thereby. An axial projection 82 extends from the right-hand end of the piston 78, as viewed in FIG. 1, and is surrounded by a spring 84 exerting a biasing force in a left-hand direction against the piston 78. As may be seen, the bore 76 is vented to the atmosphere by means of a vent opening 86, thus eliminating a pressure pocket which might tend to restrict the reciprocation of the piston within the bore 76. The left-hand end of the piston 78 is provided with an annular shoulder 87 contacting a plurality of tabs 88 extending radially inwardly from the washer 74. When the brakes are not being applied, the shoulder 87 is held against the tabs 88 by the spring 84. It will be seen that the spacing of the tabs 88 provides openings therebetween for the free flow of fluid from the passage. A plunger 90 integrally formed on the piston 78 extends axially from the left-hand end of the piston 78 and contacts the ball 60 when the same is disposed in its normal position of rest at the bottom of the ramp 58 in contact with the bottom wall of the chamber 32. The plunger 90, thereby, serves to prevent movement of the ball 60 up the ramp when the piston is in its normal position engaging the tabs 88.

It will be seen that the pressure of fluid within the bore 30 acts against the shoulder 87 of the piston 78 and tends to move the piston 78 in a right-hand direction against the spring 84. The spring 84 is proportioned to yield at a pressure in excess of the pressure normally transmitted to initially set the shoes of the brakes against the braking surface of the brake drum. For example, the spring 84 may be proportioned to permit the piston 78 to move away from the tabs 88 at a pressure between 120 and 180 pounds per square inch, or at a pressure which has been determined empirically to be less than the pressure prevailing when the ball will close. By the time this pressure is reached, the flow of fluid through the passage 56 will have been sufficiently decreased in volume to eliminate the danger of the ball 60 being washed up the ramp surface 58 and prematurely closing. Such higher pressures will also be effective to move the piston 78 to the right an amount sufficient to cause the projection 82 to seat against the end wall of the bore 76.

During initial braking or light braking, fluid will flow from the master cylinder 18 through the inlet opening to the chamber 32. A direct transmission of fluid pressure is then free to take place through the passage 56 to the right-hand end of the large bore portion 36 and thence through the outlet opening 14 to the rear wheel brake cylinders 24. This is identical to the operation of the brake system in the absence of the device of the present invention. As previously indicated, when such initial braking has reached a pressure sufficient to move the piston 78 to the right, the ball 60 will be in readiness to move up the ramp surface 58 into sealing engagement therewith. This action will occur when the deceleration has reached a predetermined magnitude established by the angle of the ramp surface 58. Under such conditions, the momentum of the ball 60 will carry it up the ramp and close the passage 56 to the inlet opening 12. After this occurrence, further pressurization of the rear brake cylinders 24 can only be accomplished by movement of the piston 42 in a right-hand direction toward the outlet opening 14. Inasmuch as the piston portion 44 against which inlet fluid pressure will react is smaller in area than the diameter of the piston portion 46 acting against and pressurizing fluid at the outlet opening 14, the pounds per square inch of pressure transmitted by the pressure generated at the outlet 14 by a given pressure at the inlet 12 is reduced. This is because, under a condition of equilibrium, the pressure on opposite ends of the piston will be inversely proportional to the effective areas of the piston acted upon by fluid pressure. Therefore, after closure of the ball 60, movement of the piston 42 in a right-hand direction against the pressure then prevailing at the outlet opening 14 could only be accomplished by a substantially increased pressure at the inlet 12 tending to move the piston 42 in a right-hand direction. However, the flexible and movable seals 52 and 66 initially afford an offsetting action to obviate what would otherwise be a period in which output pressure would remain static until a sufficient increase in inlet pressure could be developed to overcome the differential areas. The grooves and clearance spaces on the outer periphery of the piston 42 permit inlet fluid pressure to act against the O-ring 52 tending to displace it in a right-hand direction within its groove 48 and pressurize the fluid in the cavity adjacent the wall 50. Similarly, outlet fluid pressure will tend to displace the outer periphery of the seal 66 in a left-hand direction to pressurize the fluid within the cavity adjacent the sloping surface 64. Movement of the seals is resisted with an increasing force. However, movement of the seals toward one another and toward the shoulder 45 tends to pressurize the fluid within the groove 47, which acts against the shoulder 45 and tends to move the piston in a right-hand direction. Thus, during initial movement of the piston 42, the differential areas of the piston are partially offset, the magnitude of this off-setting force being diminished as the space into which the seals 66 and 52 are free to distort is constantly reduced. In this connection, it should be noted that the clearance space between the two seals and around the groove 47 must be filled with hydraulic fluid upon the assembly of the unit. While the volume of fluid pressurized by this method is minute, it is nevertheless sufficient to provide a gradual transition between the brake pressures prevailing immediately before and immediately after closure of the ball 60 and to prevent an undesirable plateau in the rear wheel brake pressure where rear wheel brake pressure would otherwise remain static until inlet fluid pressure had been sufficiently increased to offset the differential areas existing at opposite sides of the piston 42.

Subsequent movement of the piston 42 in a right-hand direction by increased master cylinder pressure will pressurize fluid at the outlet opening 14 in a fixed ratio established by the ratio of the cross-sectional areas of the piston portions 44 and 46, respectively. It will be noted that the stroke of the piston 42 is relatively short, inasmuch as most of the fluid which his normally displaced to the rear brake cylinders 24 will have traveled into the passage 56 prior to closure of the ball 60 as a safety factor. To assure that under all conditions the rear wheel cylinders 24 will receive an adequate supply of fluid, the projection 82 is effective to position the end of the plunger 90 in a location which will displace the ball 60 from the valve seat surface 58 should the travel of the piston 42 become execessive. When this occurs, a small amount of brake fluid will flow past the ball 60 into the passage 56 to directly transmit fluid pressure to the right-hand end of the bore portion 36. This increases outlet fluid pressure and moves the piston 42 to the left to re-close the ball 60. The same procedure is again repeated and the ball 60 will continue to open and close with the continued apllication of brake pressure. With the unseating of the ball 60 from the valve seat 58, the effective area of the piston portion 44 against which inlet fluid pressure acts to move the piston in a right-hand direction will be reduced by the cross-sectional area of the piston closed by the ball 60 to even further reduce the ratio of outlet fluid pressure to inlet fluid pressure at which the forces acting on the piston 42 will be in balance. This is desirable, however, as such an overtravel of the piston would occur only under very high pressures and during maximum deceleration. It should further be emphasized that this is essentially a safety feature and the normal travel of the piston 42 is not great enough to require unseating of the ball 60.

Figure 3:
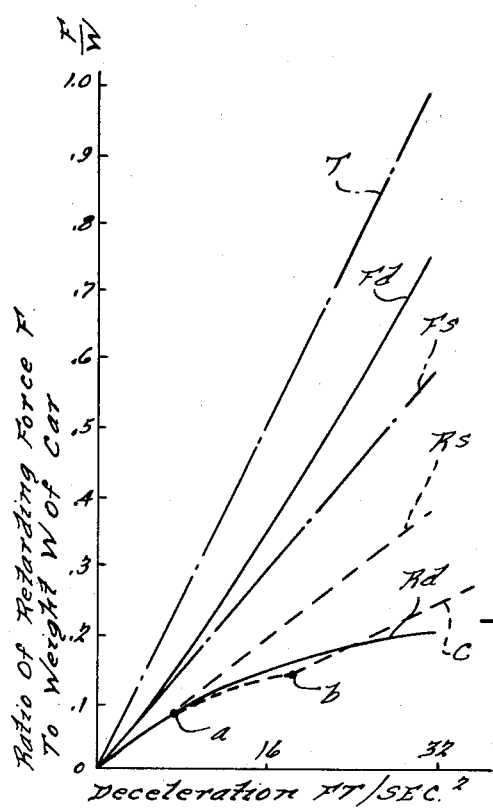
FIG. 3 is a graph showing the ideal and actual brake pressures delivered to the front and rear wheel brake cylinders as a function of deceleration.

FIG. 3 is a graphic representation of the distribution of braking force for a given vehicle during deceleration. Line T represents the total braking effort or retarding force of both front and rear wheels. The retarding force is expressed in terms of the ratio of actual braking force to the weight of the vehicle. Lines F$s$ and R$s$ represent the relative retarding effort of the front and rear brakes in the absence of the device of the present invention. The difference in these amounts may be assumed to be established by the use of different size brake cylinders, it being the standard practice to utilize larger front wheel brake cylinders than rear wheel brake cylinders in front engine passenger cars. Lines F$d$ and R$d$ represent the ideal retarding forces for the front and rear wheels during deceleration. These lines are established by the transfer of weight from the rear wheels to the front wheels. It will be noted that the proportion of retarding force of the rear brakes to the front brakes is reduced as deceleration is increased. Line C indicates the results obtained by the use of the control device of the present invention. Point $a$ on line C indicates the point at which the ball 60 closes. Point $b$ represents the point at which the O-ring 52 and seal 66 have been fully distorted. After point $b$, the ratio is fixed and line C is perfectly straight. That portion of line C between points $a$ and $b$ represents the operation of the seals 52 and 66 which provide a smooth transition between the initial stage of braking and the final stage represented by that portion of line C beyond point $b$. It will be seen that line C very closely approximates the ideal distribution of braking force to the rear wheels with no interruption in the smooth application of brakes to the rear wheels.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A brake pressure control device for use in a vehicle hydraulic brake system including a housing having an inlet opening adapted to be connected to a source of fluid pressure, an outlet opening adapted to be connected to a brake cylinder and a bore in fluid communication between said openings, said bore having a small diameter portion and a large diameter portion; a piston in said bore having a small diameter portion slidable in said small diameter bore portion and a large diameter portion slidable in said large diameter bore portion, and a shoulder intermediate said piston portions; means providing an opening for the passage of fluid from said inlet opening to said outlet opening past said piston; means for closing said last named opening upon the occurrence of predetermined conditions during brake application; and a resilient seal providing a sealed connection between at least one of said piston portions and the bore portion in which it is slidable, said at least one piston portion being recessed adjacent said seal to permit limited movement of said seal in a direction toward said shoulder under the influence of fluid pressure whereby fluid between said shoulder and said seal will be pressurized by movement of said seal to apply a fluid pressure against said shoulder.

2. A brake pressure control device for use in a vehicle hydraulic brake system including a housing having an inlet opening adapted to be connected to a source of fluid pressure, an outlet opening adapted to be connected to a brake cylinder and a bore in fluid communication between said openings, said bore having a small diameter portion and a large diameter portion; a piston in said bore having a small diameter portion slidable in said small diameter bore portion and a large diameter portion slidable in said large diameter bore portion, and a shoulder intermediate said piston portions; means providing an opening for the passage of fluid from said inlet opening to said outlet opening past said piston; means for closing said last named opening upon the occurrence of predetermined conditions during brake application; and a resilient seal providing a sealed connection between at least one of said piston portions and the bore portion in which it is slidable, said at least one piston portion having an annular surface adjacent said seal which is inclined radially outwardly away from said seal to provide a cavity on the side of said seal adjacent said shoulder which is adapted to be filled with brake fluid, said cavity being in fluid communication with said shoulder.

3. A brake pressure control device for use in a vehicle hydraulic brake system including a housing having an inlet opening adapted to be connected to a source of fluid pressure, an outlet opening adapted to be connected to a brake cylinder and a bore in fluid communication between said openings, said bore having a small diameter portion and a large diameter portion; a piston in said bore having a small diameter portion slidable in said small diameter bore portion and a large diameter portion slidable in said large diameter bore portion, and a shoulder intermediate said piston portions; means providing an opening for the passage of fluid from said inlet opening to said outlet opening past said piston; means for closing said last named opening upon the occurrence of predetermined conditions during brake application; one of said piston portions having an annular groove in the periphery thereof provided with a side wall inclined radially outwardly away from the center of said groove; and an O-ring positioned within said groove providing a sealing connection between said piston and the wall of said bore; the space in the side of said O-ring adjacent said shoulder being in fluid communication with said shoulder.

4. A brake pressure control device for use in a vehicle hydraulic brake system including a housing having an inlet opening adapted to be connected to a source of fluid pressure, an outlet opening adapted to be connected to a brake cylinder and a bore in fluid communication between said openings, said bore having a small diameter portion and a large diameter portion; a piston in said bore having a small diameter portion slidable in said small diameter bore portion and a large diameter portion slidable in said large diameter bore portion, and a shoulder intermediate said piston portions; means providing an opening for the passage of fluid from said inlet opening to said outlet opening past said piston; a valve element for closing said last named opening upon the occurrence of predetermined conditions during brake operation; a seal having a flat wall portion engageable with said piston at one end thereof and a radially outer portion sealingly engaging the wall of said bore, and a recessed surface on the end of said piston engaged by said seal extending annularly about said piston adjacent the radially outer margin thereof, said recessed surface extending radially outwardly and away from said seal to form a cavity between said surface and said seal, said cavity being in fluid communication with said shoulder.

5. A brake pressure control device for use in a vehicle hydraulic brake system including a housing having an inlet opening adapted to be connected to a source of fluid pressure, an outlet opening adapted to be connected to a brake cylinder and a bore in fluid communication between said openings, said bore having a small diameter portion and a large diameter portion; a piston in said bore having a small diameter portion slidable in said small diameter bore portion and a large diameter portion slidable in said large diameter bore portion, and a shoulder intermediate said piston portions; means providing an opening for the passage of fluid from said inlet opening to said outlet opening past said piston; a valve element for closing said last named opening upon the occurrence of predetermined conditions during brake application; said small diameter piston portion having an annular groove formed in the periphery thereof provided with opposite radially outwardly diverging side walls; an O-ring disposed in said groove providing a sealing connection between said small diameter piston portion and the wall of said small diameter bore portion, said O-ring and the side wall of said groove adjacent said shoulder defining a cavity therebetween, and a seal engaging the end of the large diameter portion of said piston and having a radially outer portion sealingly engageable with the wall of the large diameter portion of said bore, said large diameter piston portion having an annular recessed surface at the radially outer margin of the end thereof engaged by said seal, said recessed surface being inclined radially outwardly away from said seal and forming a cavity between said recessed surface and said seal, said piston being proportioned to permit the transmission of fluid pressure between said O-ring and said shoulder and between said seal and said shoulder.

6. A brake pressure control device for use in a vehicle hydraulic brake system including a housing having an inlet opening, an outlet opening and a bore providing fluid communication between said inlet opening and said outlet opening; a first piston slidably disposed in said bore; means providing a passage for the flow of fluid from said inlet opening to said outlet opening past said first piston; a valve element positioned adjacent said passage and adapted to close said passage upon the occurrence of predetermined conditions during brake application to prevent further transmission of fluid pressure to said outlet opening except by movement of said first piston, a second piston means exposed to inlet fluid pressure on one side thereof and having a portion positioned adjacent said valve to prevent closure of said valve when in a first position, and spring means biasing said second piston to hold said second piston in said first position, said spring means being yieldable under the influence of a predetermined inlet fluid pressure acting against said piston to permit retraction of said piston portion away from said first position clear of said valve element.

7. A brake pressure control device for use in a vehicle hydraulic brake system including a housing having an inlet opening, an outlet opening and a first bore providing fluid communication between said inlet opening and said outlet opening; a first piston slidably disposed in said first bore, means providing a passage for the flow of fluid from said inlet opening to said outlet opening past said first piston, a valve element positioned adjacent said passage and adapted to close said passage upon the occurrence of predetermined conditions during brake application to prevent further transmission of fluid pressure to said outlet opening except by movement of said first piston, means in said housing providing a second bore having an end wall, a second piston slidably disposed in said second bore, said piston having a portion engageable with said end wall upon movement thereof in one direction and a plunger portion adapted to be positioned adjacent said valve element upon movement thereof in the opposite direction to prevent closure of said valve element, and a spring biasing said plunger to the latter of said positions, said spring being yieldable under the influence of a given inlet fluid pressure to a position in which said plunger portion engages said end wall.

8. A brake pressure control device for use in a vehicle hydraulic brake system including a housing having an inlet opening, an outlet opening and a first bore providing fluid communication between said inlet opening and said outlet opening, a first piston slidably disposed in said bore and having an opening therethrough for the transmission of fluid pressure from said inlet opening to said outlet opening through said piston, a valve element positioned adjacent one end of said piston and adapted to close the opening to said piston upon the occurrence of predetermined conditions during brake application, means in said housing forming a second bore, a second piston slidably disposed in said second bore and having a plunger portion extending through said piston opening to a position preventing closure of said valve element when said second piston is in a first position, and a spring biasing said piston to said first position, said spring being yieldable under a given inlet fluid pressure acting on said piston to permit retraction of said second piston and plunger to a position clear of said valve element.

9. A brake pressure control device for use in a vehicle hydraulic brake system including a housing having an inlet opening, an outlet opening and a bore providing fluid communication between said inlet opening and said outlet opening; a first piston slidably disposed in said bore; means providing a passage for the flow of fluid from said inlet opening to said outlet opening past said first piston; a combined ramp and valve seat surface of annular conical shape formed at one end of said passage, and a ball supported at the bottom of said combined ramp and valve surface out of sealing engagement with said surface, said ball being operable to move up said surface and into sealing engagement therewith upon the attainment of a predetermined rate of vehicle deceleration to prevent the direct transmission of fluid pressure through said passage from said inlet opening to said outlet opening.

References Cited in the file of this patent
UNITED STATES PATENTS

| | | |
|---|---|---|
| 2,239,955 | Freeman | Apr. 29, 1941 |
| 2,241,191 | Freeman | May 6, 1941 |
| 2,903,100 | Freeman | Sept. 8, 1959 |
| 2,920,451 | Milster | Jan. 12, 1960 |